(12) United States Patent
Auernheimer et al.

(10) Patent No.: US 10,506,822 B2
(45) Date of Patent: *Dec. 17, 2019

(54) SYSTEM AND METHOD FOR COOKING PIECES OF PROTEIN

(71) Applicants: Mark Auernheimer, Richmond, VA (US); Zachary Shepard, Cincinnati, OH (US); Jeffrey D. Cowles, St. Simons Island, GA (US)

(72) Inventors: Mark Auernheimer, Richmond, VA (US); Zachary Shepard, Cincinnati, OH (US); Jeffrey D. Cowles, St. Simons Island, GA (US)

(73) Assignee: SUGAR CREEK PACKING CO., Hamilton, OH (US)

( * ) Notice: Subject to any disclaimer, the term of this patent is extended or adjusted under 35 U.S.C. 154(b) by 184 days.

This patent is subject to a terminal disclaimer.

(21) Appl. No.: 15/398,385

(22) Filed: Jan. 4, 2017

(65) Prior Publication Data

US 2017/0156377 A1  Jun. 8, 2017

Related U.S. Application Data

(60) Provisional application No. 62/405,645, filed on Oct. 7, 2016.

(51) Int. Cl.
*A23L 5/10* (2016.01)
*A23P 20/12* (2016.01)
(Continued)

(52) U.S. Cl.
CPC .  *A23L 5/11* (2016.08); *A23L 5/10* (2016.08); *A23L 13/03* (2016.08); *A23L 17/75* (2016.08); *A23P 20/12* (2016.08); *A23V 2002/00* (2013.01)

(58) Field of Classification Search
None
See application file for complete search history.

(56) References Cited

U.S. PATENT DOCUMENTS 3,597,228 A  8/1971  Jeppson et al.
3,956,515 A  5/1976  Moore
(Continued)

FOREIGN PATENT DOCUMENTS

FR  2 784 863  4/2000
GB  848014  9/1960
(Continued)

OTHER PUBLICATIONS

Gallary, Christine. "This One Tip Makes Homemade Fried Chicken Way More Fun" Jun. 12, 2014 https://www.thekitchn.com/why-you-should-precook-the-chicken-for-fried-chicken-tips-from-the-kitchn-204523 (Year: 2014).*

(Continued)

*Primary Examiner* — Viren A Thakur
(74) *Attorney, Agent, or Firm* — Thompson Hine LLP

(57) ABSTRACT

A system for cooking pieces of protein may include a batter applicator that receives a batter made from high-gluten flour and coats the batter on pieces of protein, a thermoforming packaging machine that receives the pieces of protein coated with the batter from the batter applicator and seals the pieces of protein in plastic pouches, and a heating unit that receives the plastic pouches from the thermoforming packaging machine and cooks the battered protein in the plastic pouches. A method for cooking pieces of protein may include coating a batter made from high-gluten flour on the pieces of protein; sealing the pieces of protein coated with the batter in plastic pouches; and cooking the battered protein in the plastic pouches to make cooked, battered protein pieces in which the batter is tacky after cooking. The (Continued)

cooked protein pieces may be removed from the plastic pouches, breaded, and flash fried.

20 Claims, 2 Drawing Sheets

(51) Int. Cl.
  *A23L 13/00* (2016.01)
  *A23L 17/00* (2016.01)

(56) References Cited

U.S. PATENT DOCUMENTS

| | | | |
|---|---|---|---|
| 3,966,980 A | 6/1976 | McGuckian | |
| 4,054,673 A | 10/1977 | Kaufman | |
| 4,078,517 A * | 3/1978 | Castellano | A23P 20/12 118/16 |
| 4,214,548 A * | 7/1980 | Booth | A23P 20/12 118/18 |
| 4,680,186 A | 7/1987 | Sheehy et al. | |
| 4,764,386 A | 8/1988 | Bernacchi | |
| 4,948,603 A | 8/1990 | Bernacchi | |
| 5,008,121 A | 4/1991 | Bernacchi | |
| 5,020,427 A | 6/1991 | Kennefick | |
| 5,403,600 A | 4/1995 | Reutimann et al. | |
| 5,631,035 A | 5/1997 | Clarke et al. | |
| 5,702,741 A | 12/1997 | Reutimann | |
| 6,042,871 A | 3/2000 | Cohen | |
| 6,510,810 B2 | 1/2003 | Nothum | |
| 8,216,510 B2 | 7/2012 | Garrett et al. | |
| 2004/0058035 A1* | 3/2004 | Kelleher | A23L 13/42 426/92 |
| 2004/0191376 A1 | 9/2004 | Kramer | |
| 2004/0262301 A1 | 12/2004 | Young et al. | |
| 2005/0008738 A1 | 1/2005 | Tarver | |
| 2005/0142257 A1 | 6/2005 | Long | |
| 2008/0023101 A1 | 1/2008 | Rudesill | |
| 2008/0187630 A1* | 8/2008 | Vimini | A23P 20/12 426/96 |
| 2010/0056628 A1 | 3/2010 | Stockel et al. | |
| 2011/0070339 A1 | 3/2011 | O'Connor | |
| 2012/0100273 A1 | 4/2012 | Guillaud | |
| 2012/0196004 A1* | 8/2012 | Pickford | A23P 20/12 426/95 |
| 2013/0040017 A1 | 2/2013 | White | |
| 2014/0093627 A1 | 4/2014 | Bender | |
| 2015/0010679 A1 | 1/2015 | Strong | |
| 2015/0064322 A1 | 3/2015 | Guillaud | |
| 2015/0230501 A1 | 8/2015 | Bertin | |
| 2015/0296847 A1* | 10/2015 | James | A23P 20/10 426/95 |
| 2017/0013865 A1 | 1/2017 | Valentine | |

FOREIGN PATENT DOCUMENTS

| | | |
|---|---|---|
| GB | 2 113 522 | 8/1983 |
| GB | 2 232 572 | 12/1990 |
| GB | 2 260 071 | 4/1993 |
| JP | 2002-306133 | 10/2002 |
| RU | 2539215 C1 | 1/2015 |
| WO | 88/03761 | 6/1988 |
| WO | 97/00622 | 1/1997 |
| WO | 97/05020 | 2/1997 |
| WO | 00/62632 | 10/2000 |
| WO | 2004/000039 | 12/2003 |
| WO | 2007/017542 | 2/2007 |

OTHER PUBLICATIONS

Dispirito, Rocco. "Flash Fried Finger Lickin' Chicken" May 2010 https://www.epicurious.com/recipes/food/views/flash-fried-finger-lickin-chicken-363444 (Year: 2010).*

"Types of Wheat Flour" 2007 http://web.archive.org/web/20070220135934/https://www.recipetips.com/kitchen-tips/t--1026/types-of-wheat-flour.asp (Year: 2007).*

"Batter Fried Chicken Fingers" Jun. 23, 2013 http://web.archive.org/web/20130623070935/http://www.goldnplump.com/recipe/cfm?id=127 (Year: 2013).*

"Bakelnfo" Feb. 23, 2014 http://web.archive.org/web/20140223073854/https://www.bakeinfo.co.nz/Facts/Bread-making/Bread-ingredients/Starch (Year: 2014).*

"5 Surprising Things You Can Sous Vide: Fried Chicken". https://anovaculinary.com/sous-vide-fried-chicken/ (Apr. 4, 2015).

U.S., Office Action, U.S. Appl. No. 15/462,484 (dated Aug. 9, 2017).

Barbut "The Science of Poultry and Meat Processing", http://download.poutryandmeatprocessing.com/v01/SciPoultryAndMeatProcessing%20-%20Barbut%20-%2014%20Battering%20%26%20Breading%20-%20v01.pdf (Sep. 12, 2015).

"Triple Dipped Fried Chicken", http://web.carchive.org/web/20150904042022/https://www.allrecipes.com/recipe/89268/triple-dipoed-fried-checken/ (Sep. 4, 2015).

U.S., Office Action, U.S. Appl. No. 15/462,484 (dated Aug. 31, 2018).

PCT, International Search Report and Written Opinion, International Application No. PCT/US2017/055600 (dated Jan. 30, 2018).

Jang, Jae Deok, et al.; "Development of a sous-vide packaging process for Korean seasoned beef"; Article in Food Control; DOI: 10.1016/j.foodcont.2004.03.008; 7 pages (Mar. 2005).

Díaz, Pedro et al.; "Microbial, physical-chemical and sensory spoilage during the refrigerated storage of cooked pork loin processed by the sous vide method"; DOI: 10.1016/j.meatsci.2007.12.002; pp. 287-292 (Dec. 3, 2007).

Díaz, Pedro et al.; "Determination of Shelf Life of Sous Vide Salmon (*Salmo salard*) Based on Sensory Attributes"; Journal of Food Science, vol. 74, No. 8; pp. 371-376 (2009).

"72-Hour Sous Vide Short Ribs"; Seattle Food Geek; available at http://Seattlefoodgeek.com/2010/04/72-hour-sous-vide-short-ribs/ 7 pages (at least as early as Apr. 11, 2010).

Freda, Barbara; "Sous Vide Batter-Dipped Fried Chicken with Honey and Waffles"; http://recipes.anovaculinary.comuser/Barbara-freda; Anova Culinary; 5 pages (as early as Nov. 23, 2014).

Kavey Eats; "Southern Fried Chicken / Making Use of Sous Vide"; https://www.kaveyeats.com/2014/04/southern-frided-chicken-makind-use-of-sous-vide.html, 4 pages (Apr. 20, 2014).

"1st time Fried Chicken: SV'ed then battered & fried"; https://www.reddit.com/r/sousvide/comments/44ull9/1st_time_fried_chicken_sved_then_battered_fried/48 st=j1guboyk&sh=2ab3e898, 5 pages (Sep. 19, 2016).

"How do I get breading to stick to pre-cooked chicken for pan frying?13 Seasoned Advice"; https://cooking.stack.exchange.com/questions/13721/how-do-i-get-breading-to-stick-to-pre-cooked-chicken-for-pan-frying, 2 pages (Sep. 19, 2016).

Office Action, U.S. Appl. No. 15/462,484 (dated May 18, 2017).

Kasguma, Rick "Pork Spare Ribs #2", http://blog.rickk.com/food/2012/03/pork-spare-ribs-2.html (Mar. 17, 2012).

Bienvenu, Marcelle "The art and science of battering and frying: Cooking Creole", http//www.nola.com/food/index.ssf/2015/04/the_art_and_science_of_batteri.html (Apr. 20, 2015).

"Formech", http://web.archive.org/web/20150124024656/http://formtech.com/about/about-vacuum-forming/ (Jan. 24, 2015).

U.S., Office Action, U.S. Appl. No. 15/462,484 (dated Nov. 22, 2017).

Notice of Allowance, U.S. Appl. No. 15/462,484 (dated Feb. 19, 2019).

AU, Australian Patent Examination Report No. 1, Australian Patent Application No. 2017338985 (dated May 29, 2019).

PCT, Federal Institute of Industrial Property (ISA/RU), International Search Report and the Written Opinion of the International Searching Authority, International Application No. PCT/US2019/035769, 8 pages, dated Sep. 26, 2019.

* cited by examiner

SYSTEM AND METHOD FOR COOKING PIECES OF PROTEIN

TECHNICAL FIELD

The present disclosure relates to systems and methods for cooking protein, and more particularly, to systems and methods for preparing batter-coated protein pieces of meat, poultry, and fish for frying.

BACKGROUND

Fried protein, which frequently takes the form of fried chicken pieces or fried fish pieces, is a popular food. Consequently, restaurants, especially fast food and fast casual restaurants, provide such fried protein dishes on a large volume basis. Presently, preparation of such fried protein dishes in restaurants requires that the food preparer at the restaurant handle raw protein pieces to coat the protein pieces in batter, bread the batter-coated protein pieces, and then fry the protein pieces both to cook them and to harden the batter coating, typically to a firm or crispy crust. Many processes for frying protein pieces require the protein pieces to be coated, by dredging or immersion, with liquid batter that may include raw egg and/or other ingredients that may spoil at room temperature, or if kept too long, which may constitute a source of hygiene problems for the restaurant. In addition, coating uncooked protein pieces prior to frying creates a risk of the protein spoiling if allowed to remain at room temperature too long, or if refrigerated too long.

Accordingly, there is a need for a system and process for preparing fried protein dishes in a manner that minimizes the chance of contamination from using batter that inadvertently may have spoiled. There is also a need for a process and system for preparing fried protein dishes that can be performed by relatively unskilled preparers, and which eliminates the need for a food preparer to handle raw, uncooked protein pieces when coating the protein pieces and when frying them. Further, there is a need for a system and process for preparing fried protein dishes that allows broad culinary options to be employed in the final preparation step.

SUMMARY

The present disclosure describes a system and method for cooking pieces of protein, which includes meat, poultry, and fish, in which the protein pieces are first battered, then sealed in pouches, and cooked. The pouches of cooked protein pieces then are shipped in a refrigerated or frozen state for later use. The end user simply removes the previously battered and cooked protein pieces from their pouches, thaws the protein pieces if necessary, breads and/or coats the protein pieces as desired, and flash fries the pieces for serving. The batter coating the protein pieces have been selected to provide a coating that remains tacky and can accept breading and other coatings after the protein pieces are cooked in their pouches. If the cooked battered protein pieces are frozen in their pouches, when the battered protein pieces are later thawed for use, the original batter coating again becomes tacky. This eliminates the need for coating the protein pieces a second time with a batter or other tacky substance to adhere breading at the point of frying, which reduces the likelihood of contamination from batter and streamlines the food preparation process at the point of service. The system and method also provide a precooked protein product to a food preparer that reduces the occurrence of spoiled protein pieces.

In an embodiment, a system for cooking pieces of protein includes a batter applicator that receives a batter made from high-gluten flour and coats the batter on pieces of protein, a thermoforming packaging machine that receives the pieces of protein coated with the batter from the batter applicator and seals the pieces of protein in plastic pouches; and a heating unit that receives the plastic pouches from the thermoforming packaging machine and cooks the battered protein in the plastic pouches.

In another embodiment, a method for cooking pieces of protein includes coating a batter made from high-gluten flour on the pieces of protein, sealing the pieces of protein coated with the batter in plastic pouches, and cooking the battered protein in the plastic pouches to make cooked, battered protein pieces in which the batter is tacky.

In yet another embodiment, a method for frying pieces of protein includes placing pieces of protein in a flash fryer, the pieces of protein having been previously coated in a batter made from high-gluten flour, sealed in plastic pouches, and cooked in the plastic pouches to make cooked, battered protein pieces in which the batter remains tacky.

In still another embodiment, a system for cooking pieces of protein includes a batter applicator that receives a batter made from high-gluten flour and coats the batter on pieces of protein; a thermoforming packaging machine that receives the pieces of protein coated with the batter made and vacuum seals the pieces of protein in plastic pouches; a first conveyor positioned to convey the pieces of protein coated with high-gluten flour from the batter applicator to the thermoforming packaging machine; a heating unit that receives the sealed plastic pouches from the thermoforming packaging machine and cooks the battered protein in the plastic pouches, wherein the heating unit is selected from a hot water bath and a steam oven; a second conveyor positioned to convey the pieces of protein sealed in plastic pouches from the thermoforming packaging machine to the heating unit; a cold storage for chilling the plastic pouches of cooked, battered protein; and a third conveyor positioned to convey the pieces of protein sealed in plastic pouches from the heating unit to the cold storage.

In another embodiment, a food processing line for cooking pieces of protein includes an environmentally separated preparation room containing a batter applicator that receives a batter made from high-gluten flour and coats the batter on pieces of protein, and a thermoforming packaging machine that receives the pieces of protein coated with batter made from high-gluten flour and seals the pieces of protein in plastic pouches; and an environmentally separated cooking room containing a heating unit that receives the sealed plastic pouches from the thermoforming packaging machine in the preparation room and cooks the battered protein in the plastic pouches.

Other objects and advantages of the disclosed system and method for cooking pieces of protein will be apparent from the following description, the accompanying drawing, and the appended claims.

DETAILED DESCRIPTION

Figure 1:
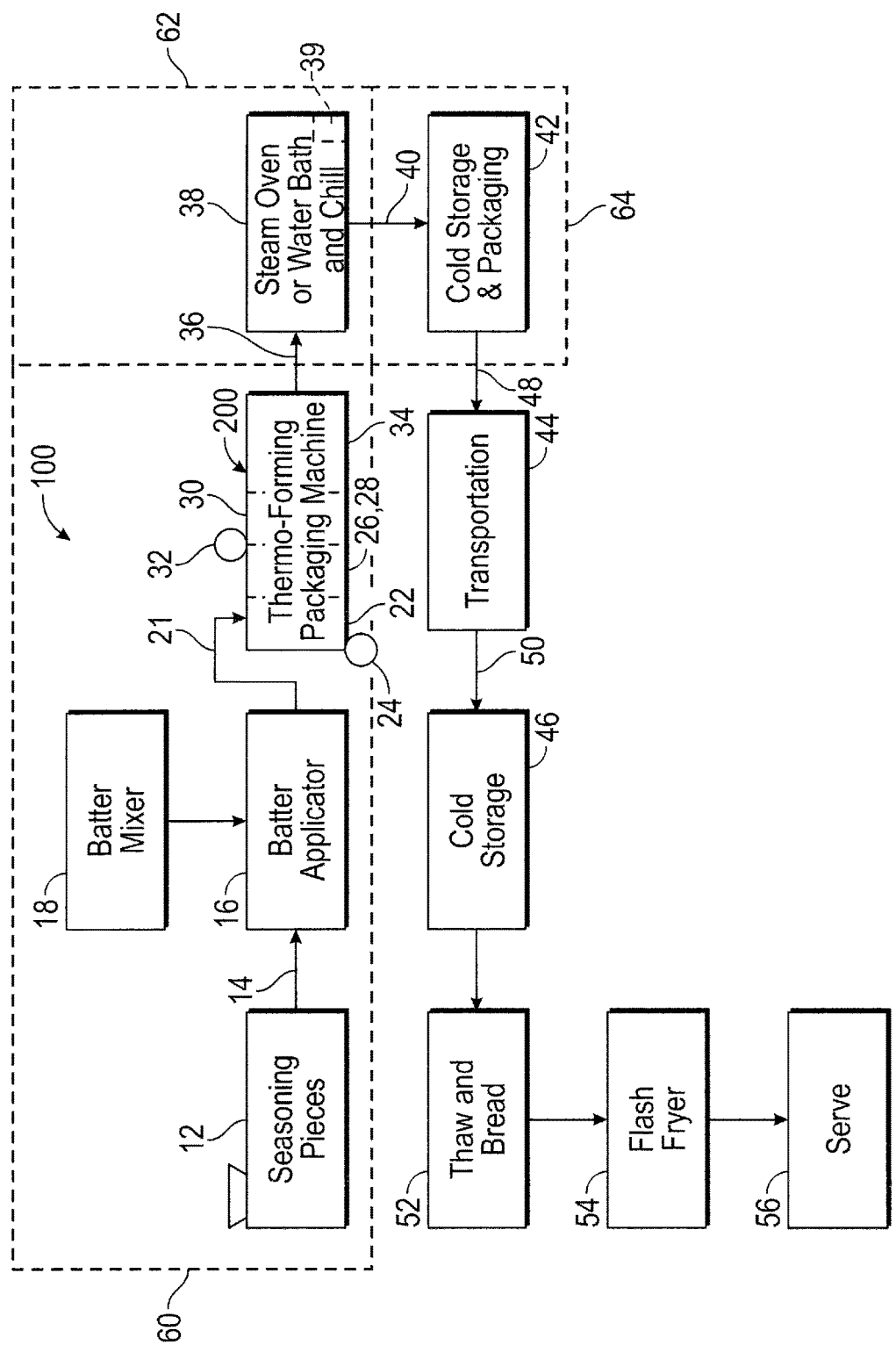
FIG. 1 is a schematic representation of an embodiment of the disclosed system for cooking pieces of protein.

As shown in FIG. 1, the system, generally designated 10, for cooking pieces of protein may include, optionally, a vacuum tumbler 12 that may receive fresh pieces of raw (i.e., uncooked) protein. The pieces of protein (see protein pieces 100 in FIG. 2) may include meat, poultry, and fish. In embodiments, the protein pieces may include whole-muscle, intact chicken pieces, other types of poultry, such as turkey and duck, or other protein such as whole (i.e., unshredded) fish pieces. In other embodiments, the protein may take the form of formed pieces of meat, shredded chicken, other poultry, and fish.

The vacuum tumbler 12 may be of the type that tumbles the protein pieces with salt and flavorings under a vacuum. The seasoned pieces of protein may be conveyed by an optional conveyor 14, or conveyed manually, such as by trays, to a batter applicator 16. There, pieces of protein may be coated with a batter in the batter applicator 16. In an embodiment, the batter applicator 16 may include or consist of a BatterPro batter applicator manufactured by Nothum Food Processing Systems of Springfield, Mo., or any one or more various batter applicators, such as those manufactured by John Bean Technologies Corp. of Chicago, Ill., including the Heritage XL, APB, Rotary Drum, and T-1 models. Optionally, the batter applicator 16 may be supplied by batter from a batter mixer 18, such as a batter mixer manufactured by Nothum Food Processing Systems of Springfield, Mo. Alternatively, dipping, drench/waterfall, conveyor-style, rotary drum, and batter-breading equipment may be used. Alternatively, the application of batter to the protein pieces may be done manually.

In embodiments, the batter includes a mixture of flour and water, and in certain embodiments, the flour may consist of, or include, a high-gluten flour mixed with water because it will be sticky or tacky until fried. In more specific embodiments, the flour may be selected to have between approximately 12% to 25% gluten. A high-gluten flour (often used for bread flour) that may be used is typically approximately 12% to 15% gluten. In still other embodiments, a batter made from flour of greater than approximately 15% gluten may be used.

The water-to-flour mixture for the high-gluten batter may be in the range of approximately 60% water to 40% flour by volume, which may be preferred for chicken. A ratio of approximately 70% water to 30% flour by volume may be preferable for dryer proteins. Batter made from water-to-flour ratios between these two also may be acceptable. In embodiments, a water-to-flour ratio of as high as 88% water to 15% water may be functional. It is preferable to use a relatively sticky, high-gluten flour. In embodiments, it may be desirable to add egg white, egg, milk, buttermilk, seasonings, soy, fish meal, meat-meal, nut meal, legume-flour, pea-flour, or other proteins to the batter, but such additional ingredients are optional and not essential to the effectiveness of the disclosed system and method.

The system 10 also may include a thermoforming packaging machine, generally designated 20, that receives the battered protein pieces from the batter applicator 16. The pieces may be conveyed to the thermoforming packaging machine 20 by a first conveyor 21, and/or manually by carrying trays of battered protein pieces to the thermoforming packaging machine. A typical thermoforming packaging machine 20 that may be employed in the system 10 is a Multivac R 530, manufactured by MULTIVAC Sepp Haggenmüller SE & Co. KG. Such a thermoforming packaging machine 20 may include a forming station 22 that receives a lower web 24 of formable sheet plastic from a roll and forms or shapes the plastic sheet by the effect of heat, compressed air and vacuum. The food-grade plastic may be selected to be heat sealable and able to withstand food cooking temperatures, such as for sous vide or steam cooking, which may range from 140° F. to 170° F. or higher, depending upon the type of protein cooked.

The pliable sheet of the lower web 24 may be conveyed to a loading area 26 of the thermoforming packaging machine 20 in which the sheet is placed into cavities on a tray shown schematically as 28 in FIG. 1. The battered pieces of raw, uncooked protein are placed in the individual cavities of the tray 28 in the loading area 26, and the trays are moved to a sealing station 30 of the thermoforming packaging machine 20, where an upper web 32 of formable sheet plastic is applied on top of the lower web 24 and over the protein pieces. In an embodiment, the battered pieces of protein may be manually removed from the first conveyor 21 and placed into the cavities of the tray 28 of the thermoforming packaging machine 20, which may be lined with the lower web 24. The upper and lower webs 24, 32 may be sealed hermetically to each other at the sealing station 30 by means of a seal seam to form bags or pouches (see bags or pouches 106 in FIG. 2), each containing a piece or pieces of battered protein. The sealed bags or pouches are conveyed to a crosscutting and longitudinal cutting unit station 34 of the thermoforming packaging machine 20 where they are sliced into individual sealed plastic bags or pouches, each containing one or more battered protein pieces. In an embodiment, air may be evacuated from the bags or pouches of battered protein pieces by the thermoforming packaging machine 20 such that they are vacuum sealed. In other embodiments, air may not be evacuated from the bags or pouches before sealing.

Figure 2:
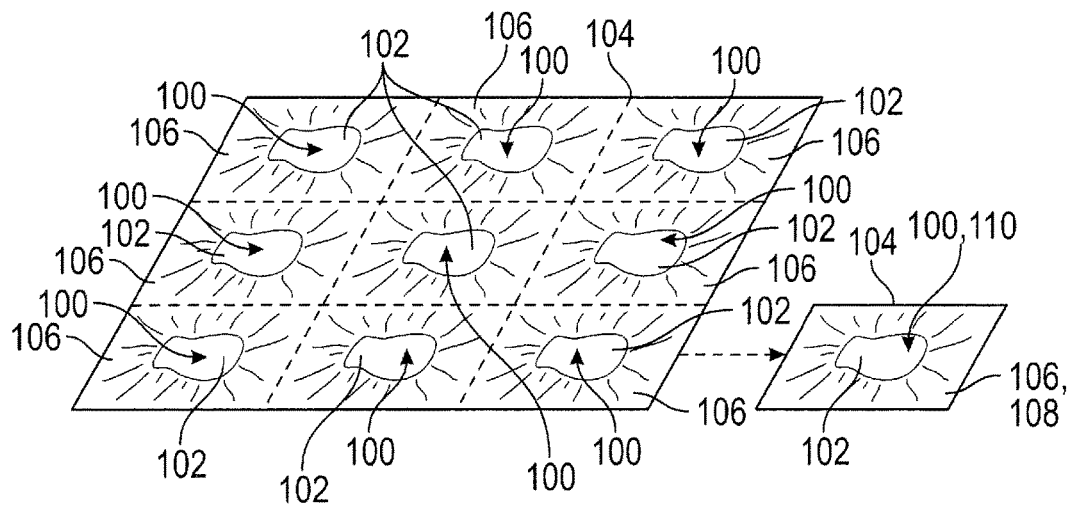
FIG. 2 is a perspective view of pieces of protein sealed by the thermoforming packaging machine of the system of FIG. 1 into individual bags or pouches, showing a separated individually sealed piece of protein in a bag or pouch.

As shown in FIG. 2, the individual battered protein pieces 100, which are coated on their outer surfaces with the high gluten batter 102, may be hermetically sealed within heat seal seams 104 forming individual pouches 106 by the thermoforming packaging machine 20 (FIG. 1). In embodiments, a single piece of battered protein 100 is sealed in one or more of the pouches 106; in other embodiments, more than one piece of battered protein 100 is sealed in one or more of the pouches 106. Crosscutting and longitudinal cutting unit station 34 may cut the pouches 106 into individual sealed plastic bags or pouches 108 along heat seal seams 104. The terms "in-bag" and "in-pouch," and "bag" and "pouch" each shall be used interchangeably herein.

As shown in FIG. 1, the individual pouches 108 may be conveyed either manually and/or by a second conveyor 36 to a heating unit, generally designated 38, that may take the form of a steam oven or a heated water bath. There, the sealed pouches 108 are heated to cook the battered protein pieces 100 thoroughly in-pouch. Cooking temperatures may range from 140° F. to 170° F., depending upon the type of protein piece cooked, and the desired texture of the protein. In one embodiment, the vacuum-formed, vacuum-sealed pouches 108 are sous vide cooked in a steam oven 38 that thoroughly and fully cooks the battered protein pieces 100 in-pouch. The temperatures and times of cooking will vary depending upon the specific type of protein to be cooked and thickness of the protein pieces 100. In any event, the protein pieces 100 must be thoroughly and completely cooked sufficiently to meet food safety requirements for both private and public consumption. At the same time, the temperatures and times are selected to be below that which would harden the batter 102 coating the protein pieces 100.

After the in-pouch protein pieces 100 are thoroughly cooked, the battered cooked protein pieces 110 are chilled. In embodiments, the battered cooked protein pieces may be chilled to 40° F. The requisite chill temperature, chilling time, and the time interval between cooking and chilling the protein pieces 110, may vary depending upon the type of protein to be chilled and United States Department of Agriculture (USDA) regulations. In embodiments, if the in-pouch cooked protein pieces 110 are cooked in a water bath, such as sous vide cooked, the cooked protein pieces may be chilled in a cold water bath in the same vessel 38. In other embodiments, such as where the heating unit 38 takes the form of a steam oven, the in-bag or in-pouch cooked protein pieces 110 may be chilled in a separate cold water bath or chilling apparatus 39, which may take the form of a tank of chilled water.

The chilled in-pouch cooked protein pieces 110 may be conveyed by a third conveyor 40, and/or in embodiments conveyed manually or by pallet moving equipment, to a cold storage 42. The cold storage 42 may maintain the cooked protein pieces 110 in-pouch 108 chilled for intermediate storage duration, or alternatively, freeze the cooked battered protein pieces 110 in-pouch 108 for longer term storage and subsequent transportation. In embodiments, the cold storage 42 may include packaging the individual in-pouch cooked protein pieces. Packaging may include placing predetermined numbers of the bags or pouches 108 in plastic totes, bulk boxes, and/or corrugated containers. Packing of the pouches or bags 108 may be performed either before or after freezing the chilled cooked battered protein pieces 110 in the cold storage 42. Further, the cooked and chilled battered protein pieces 110 may be flash frozen in the cold storage 42.

The cooked battered protein pieces 110, now frozen in individual pouches 108 and packaged, may be transported by a mechanism, schematically represented as 44, from the cold storage 42. The transportation mechanism 44 may take the form of a conveyor, a refrigerated truck, or an unrefrigerated delivery vehicle, the latter of which may require insulated containers for the bags or pouches 108. The bags or pouches 108 of frozen, cooked battered protein pieces 110 may be placed into the transportation vehicle 44 by a conveyor 48, and/or by hand-loading or loading with a loading device such as a pallet lifter or pallet truck (not shown).

When delivered to the destination remote food service facility, the containers of frozen in-bag cooked protein pieces 110 may be unloaded from the transportation vehicle 44 manually and/or by mechanical means, indicated schematically at 50, and may be stored in a destination cold storage facility or receptacle 46 that may be associated with an end user. The cold storage 46 may be a remote cold storage facility such as at a restaurant, including a fast food restaurant and a fast casual restaurant, or other food service provider. At the remote facility, when ready for consumption, a bag or bags 108 of frozen cooked protein pieces 110 are unpacked and removed from the cold storage 46, and if necessary thawed, at which time the batter 102 again becomes tacky. If the bag or bags 108 of cooked protein pieces 110 are refrigerated or chilled, but not frozen, the batter 102 coating the cooked protein pieces already will be tacky. The cooked battered protein pieces 110 may be removed from their pouches 108 and hand rolled in breading or other coating, or tumbled in breading or other coating in a tumbler (not shown). The breading or other coating will adhere to the batter 102 coating of the cooked protein pieces 110 because it is tacky. Additional batter or other coating substances is not required at this point to get the breading or other coating to adhere to the cooked protein pieces 110.

In an embodiment, the breaded cooked protein pieces 110 then may be placed in a cooking device 54, such as a flash fryer. The flash fryer 54 may have cooking oil at a temperature of, or approximately, 400° F. or greater and the flash frying may take place for 90 seconds, or approximately 90 seconds. For larger pieces 110, for example a large, thick 9 oz. boneless breast portion cut from and 18 oz. chicken breast, or a large bone-in thigh, a cook temperature of approximately 325° F. to 350° F. for 150 seconds may be preferable. Cook temperatures may be from approximately 305° F. to 445° F. with multiple oil types, such as canola, vegetable shortening, cottonseed, beef tallow, and the like. In any event, the flash frying is at an oil temperature and for a time sufficient to harden the batter coating 102 and attach the second coating of breading or other particulate coating to the cooked protein piece 110, and to bring the previously cooked protein pieces 110 to serving temperature. The cooked protein pieces 110, now flash fried, are ready for serving as indicated block 56, which may be a serving table or individual plate.

In other embodiments, the cooking device 54 may take the form of a microwave oven, a convection oven, an infrared oven, or an oven with conventional resistance heating elements or gas burners. In still other embodiments, the cooking device 54 may be a skillet, a hot plate, an over-fired broiler, a chargrill, and a flat grill. In other embodiments, the cooked battered protein pieces 110 may be heated to serving temperature without breading, so that the batter coating 102 simply is hardened on the previously cooked battered protein pieces. The cooked battered protein pieces 110 also may be flash fried, then heated to serving temperature by one of the aforementioned methods, either before or after flash frying. Flash frying the cooked, battered, and breaded protein pieces 110 hardens the exterior of the protein piece and adheres the breading to the tacky batter coating 102.

In an embodiment, the system 10 for cooking pieces of protein may take the form of a food processing line that may include an environmentally separated preparation room 60 that contains the vacuum tumbler 12, the batter applicator 16, the batter mixer 18, and the thermoforming packaging machine 20. The food processing line 10 also may include an environmentally separated cooking room 62 that contains the heating unit 38, which also may include a chill bath 39, and an environmentally sealed cold room 64 containing the cold storage 42. Each of the preparation room 60, the cooking room 62 and the cold room 64 may be environmentally separated, which may include individually atmospherically and structurally isolating them from the ambient environment and from each other to effectively prevent any contamination occurring.

The first conveyor 21 may convey the pieces of protein coated with high-gluten flour from the batter applicator 16 to the thermoforming packaging machine 20 in the preparation room 60. The second conveyor 36 may convey the pieces of battered protein 100 sealed in plastic pouches 106 from the thermoforming packaging machine 20 in the preparation room 60 to the heating unit 38 in the cooking room. The third conveyor 40 may convey the pieces of protein sealed in plastic pouches from the heating unit 38 in the cooking room 62 to the cold storage 42 in the cold room 64. The second conveyor 36 and third conveyor 40 may pass through the walls separating the preparation room 60 and the cooking room 62, and the cooking room and the cold room 64, respectively, through openings that restrict air passage between the rooms.

Thus, the vacuum tumbler 12, batter applicator 16, and thermoforming packaging machine 20 may be series connected by the optional conveyor 14 and the first conveyor 21, respectively, in preparation room 60. The heating unit 38 may be series connected to the thermoforming packaging machine 20 by way of second conveyor 36, and the cold storage 42 may be series connected to the heating unit 38 by way of the third conveyor 40. Thus, the vacuum tumbler 12, the optional conveyor 14, the batter applicator 16, the first conveyor 21, the thermoforming packaging machine 20, the second conveyor 26, the heating unit 38, the third conveyor 40, and the cold storage 40 may be series connected in that order, as shown in FIG. 1.

Figure 3:
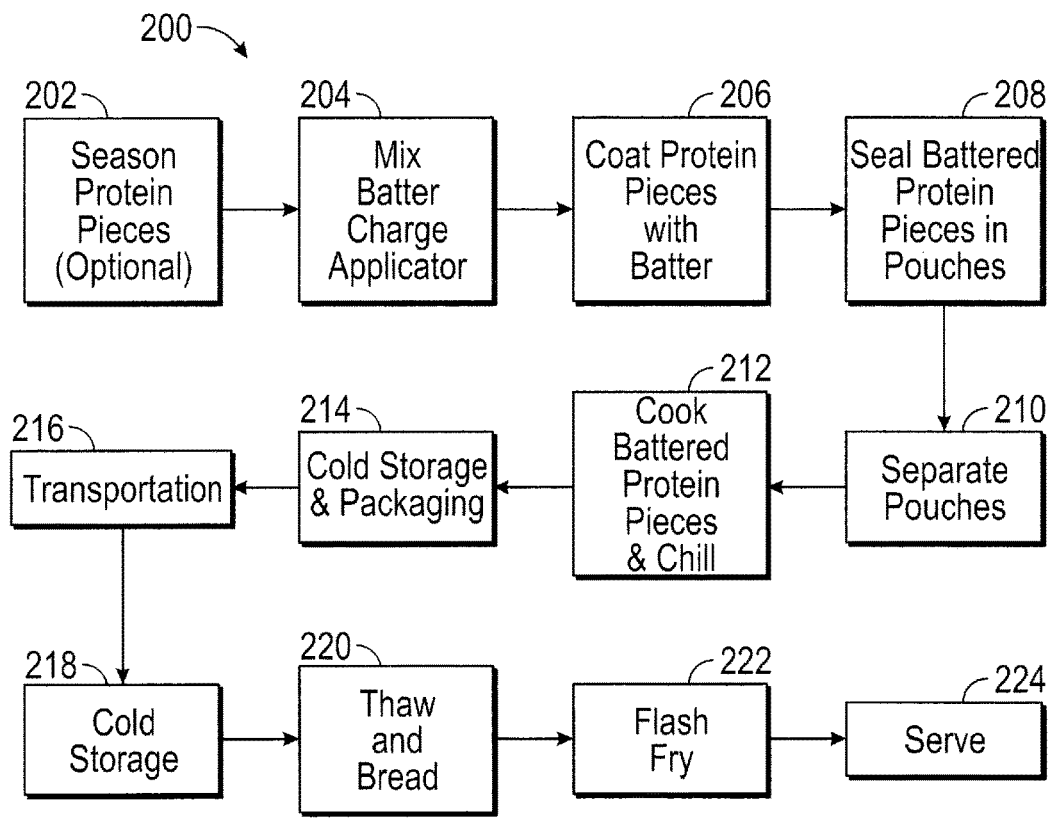
FIG. 3 is a flow chart showing an embodiment of the disclosed method for cooking pieces of protein.

As shown in FIG. 3, the foregoing system 10 provides a process 200 for cooking pieces of protein 100 that may be stored in a cold storage 42 and later breaded and flash fried without the addition of batter at the time of flash frying. As indicated in block 202, the process 200 may begin by placing pieces 100 (see FIG. 2) of raw, uncooked protein, such as meat, poultry, or fish, which in a particular embodiment may be whole meat chicken, in a vacuum tumbler 12 (see FIG. 1) to coat the protein pieces with seasoning. As shown in block 204, a high-gluten batter 102 is prepared in the batter mixer 18, and the batter is charged into the batter applicator 16. As indicated in block 206, the raw, uncooked protein pieces 100, which optionally may be seasoned by the vacuum tumbler 12 and conveyed by optional conveyor 14 to the batter applicator 16 are coated with batter 102 in the applicator. Alternatively, raw, uncooked protein pieces 100 may be placed directly into the batter applicator 16 and coated with batter 102 without having been seasoned. In embodiments, the process steps in blocks 202 and 204 may be performed sequentially in the order shown in FIG. 3, or performed simultaneously, or performed in reverse order shown. It also is within the scope of the disclosure to perform these and other steps of process 200 continuously and/or in batch mode.

As indicated in block 208, the uncooked battered protein pieces 100 are conveyed by the first conveyor 21 to the thermoforming packaging machine 20, wherein the battered protein pieces are sealed in a sheet of individual pouches 106, and are separated into individual pouches 108, as indicated in block 210. As indicated in block 212, the in-pouch cooked battered protein pieces 100 are conveyed by the second conveyor 36 to cooking device 38, such as a steam oven or heated water bath, where the battered protein pieces are thoroughly cooked. After cooking, the in-pouch cooked and battered protein pieces 110 may be chilled, which may be in the chilled water bath 39, or the chilled water may be introduced into the same vessel used for the hot water bath that cooks the protein pieces 110. As indicated in block 214, the in-bag or in-pouch cooked battered protein pieces 110, now chilled, may be stored in cold storage 42, in which they may be frozen or maintained chilled without freezing. At this time, the pouches 108 may be packaged in containers, such as totes, bulk boxes, and/or corrugated cases. The packaging of pouches 108 may take place after the chilling of the protein pieces 110 and either before or after freezing in the cold storage 42. Predetermined numbers of pouches 108 may be packaged in containers as desired, for example, to fulfill customer orders, or in predetermined assortments or groupings. As indicated in block 216, the packages of pouches 108 later may be transported to a restaurant or other food service facility by a vehicle 44.

As indicated in block 218, the containers of pouches 108 of frozen or chilled cooked battered protein pieces 110, may be stored in cold storage 46 at the point of delivery for use as needed by the restaurant or food service facility. As indicated in block 220, when needed, one or more pouches 108 of cooked battered protein pieces 110 may be unpacked from their containers, thawed or warmed, and the protein pieces removed from their pouches. If the pouches 108 have been chilled and not frozen, the batter 102 on the cooked protein pieces 110 is tacky when the cooked battered protein pieces are removed from their pouches. If the cooked battered protein pieces 110 have been frozen, the batter 102 will become tacky when the cooked battered protein pieces thaw. In either case, the cooked battered protein pieces 110 may be removed from their pouches 108, and because of the tacky coatings 102, breaded with a breading of choice, which may be selected from any number of predetermined breading formulations, without need of an additional coating of batter or other substance to make the breading adhere to the cooked battered protein pieces 110.

As indicated in block 222, the cooked battered protein pieces 110, now breaded, may be placed in a cooking device, such as the flash fryer 54, and flash fried to harden or make crisp the batter 102 and breading. Since the protein pieces 110 are already cooked, it is only necessary to flash fry the protein pieces sufficiently to harden the batter and warm the protein pieces to a predetermined serving temperature. As indicated in block 224, the flash fried protein pieces 110 then may be served to a consumer, who may be a patron of the restaurant.

The advantage of the process 200 is that it provides cooked protein to a food service facility, such as a restaurant, which may be a fast food restaurant or a fast casual restaurant, so that the food service facility workers are relieved from handling raw or partially cooked protein, thereby minimizing the likelihood of contamination or spoilage of the protein or batter. At the same time, the protein pieces may be advertised as being hand breaded by the restaurant workers at the location of the restaurant.

While the forms of apparatus and methods described herein constitute preferred embodiments of the disclosed system and process for cooking pieces of protein, it is to be understood that the disclosure is not limited to these precise systems and methods, and that changes may be made therein without departing from the scope of the disclosure.

What is claimed is:

1. A method for cooking pieces of protein, the method comprising:
    applying a batter consisting of a mixture of flour containing gluten and water, and optionally one or more of egg white, egg, milk, buttermilk, seasonings, soy, fish meal, meat-meal, nut meal, legume-flour and pea flour, to uncooked protein pieces;
    sealing the battered uncooked protein pieces in plastic pouches; and
    cooking the sealed battered uncooked protein pieces, while in the sealed plastic pouches, at a temperature and time selected to completely cook the protein pieces, whereby the batter is sufficiently tacky such that breading can adhere thereto.

2. The method of claim 1, further comprising removing the cooked protein pieces from the plastic pouches; applying a breading to the tacky batter on the cooked protein pieces; and flash frying the breaded, cooked protein pieces.

3. The method of claim 2, wherein flash frying the breaded, cooked protein pieces includes flash frying the breaded, cooked protein pieces sufficiently to harden the batter coating and attach the breading thereto.

4. The method of claim 2, wherein flash frying the breaded, cooked protein pieces includes flash frying the breaded protein pieces in cooking oil at a temperature of at least 305° F. for at least 90 seconds.

5. The method of claim 4, wherein the cooking oil is at a temperature of between 305° F. and 445° F.

6. The method of claim 1, wherein applying the batter to the uncooked protein pieces includes applying a batter consisting of a mixture of flour having 12% to 15% gluten and water.

7. The method of claim 1, wherein applying the batter to the uncooked protein pieces includes applying a batter consisting of a mixture of flour having gluten in a range of 15% or greater and water.

8. The method of claim 1, wherein applying the batter to the uncooked protein pieces includes applying a batter consisting of a mixture of flour having greater than 12% gluten and water.

9. The method of claim 1, wherein applying the batter to the uncooked protein pieces includes applying a batter selected from a mixture consisting of about 60% high gluten flour to about 40% water by volume, and consisting of about 70% high-gluten flour to about 30% water by volume.

10. The method of claim 1, wherein applying the batter to the uncooked protein pieces includes applying the batter to the uncooked protein pieces selected from pieces of meat, pieces of poultry, and pieces of fish.

11. The method of claim 10, wherein the pieces of poultry are selected from pieces of chicken, pieces of turkey, pieces of goose, and pieces of duck.

12. The method of claim 1, wherein sealing the uncooked battered protein pieces includes sealing the protein pieces using a thermoforming packaging machine.

13. The method of claim 1, wherein cooking the sealed battered uncooked protein pieces in the sealed plastic pouches includes cooking the sealed battered uncooked protein pieces in the sealed plastic pouches in a heating unit selected from a hot water bath and a steam oven.

14. The method of claim 1, wherein cooking the sealed battered uncooked protein pieces in the sealed plastic pouches includes sous vide cooking the protein sealed in the plastic pouches.

15. The method of claim 13, wherein applying the batter includes coating the batter to the uncooked protein pieces with a batter applicator that receives the batter and coats the batter on the protein pieces.

16. A method for frying a piece of protein, the method comprising:
    applying a batter consisting of a mixture of flour containing gluten and water to the coated uncooked protein pieces, resulting in battered uncooked protein pieces consisting of the uncooked protein pieces, the coating and the batter;
    sealing the battered uncooked protein pieces in plastic pouches;
    cooking the sealed battered uncooked protein pieces, while in the sealed plastic pouches, at a temperature and time selected to completely cook the protein pieces, whereby the batter is sufficiently tacky such that breading can adhere thereto, resulting in battered cooked protein pieces; and
    removing the battered cooked protein pieces from the sealed plastic pouches and then, flash frying the battered cooked protein pieces.

17. The method of claim 16, further comprising, prior to flash frying the battered cooked protein pieces, removing the battered cooked protein pieces from the plastic pouch and breading the battered cooked protein pieces.

18. The method of claim 17, wherein breading the battered cooked protein pieces is performed without applying a batter to the battered cooked protein pieces a second time.

19. The method of claim 1, further comprising tumbling the uncooked protein pieces with salt and flavorings prior to applying the batter.

20. The method of claim 1, wherein sealing the battered uncooked protein pieces in the plastic pouches includes vacuum sealing the battered uncooked protein pieces in the plastic pouches.

* * * * *